May 12, 1964  A. GUIGNARD  3,132,907
SHOCK ABSORBING BEARING FOR TIME-PIECE WHEEL
Filed June 25, 1962

United States Patent Office 3,132,907
Patented May 12, 1964

3,132,907
SHOCK ABSORBING BEARING FOR A TIME-PIECE WHEEL
Auguste Guignard, Lausanne-Prilly, Switzerland, assignor to Golay-Buchel and Co., Lausanne-Malley, Switzerland, a corporation of Switzerland
Filed June 25, 1962, Ser. No. 204,876
Claims priority, application Switzerland July 5, 1961
10 Claims. (Cl. 308—140)

The present invention refers to a shock absorbing bearing for time-piece wheel of the type having a conical recess adapted to accommodate a cone of the pivot of a wheel, and wherein the cone angle of the recess is greater than the cone angle of the cone on the pivot.

According to the present invention, this bearing comprises a step bearing in the form of the portion of a sphere of greater extent than a hemisphere and provided with a conical recess with a height greater than the radius of the sphere and leaving an annular base surface on which said bearing rests under the influence of an elastic pressure. The base rests on an annular shoulder of a cylindrical sleeve having an inner diameter equal to the diameter of the sphere.

The attached drawing shows an embodiment of the object of the invention given by way of example;

Figure 1:
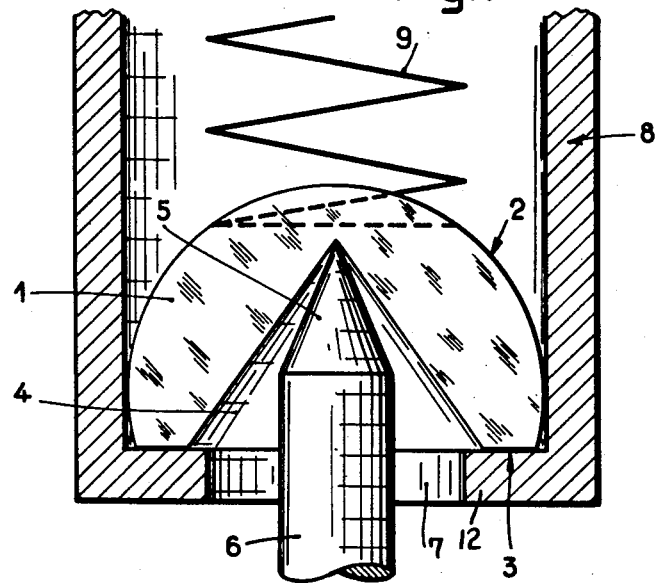
FIG. 1 is an axial vertical section of the bearing in a position of rest.

As set forth in FIG. 1, the represented shock absorbing bearing is constituted essentially of a step bearing 1 having the shape of a spherical dome 2 with a base 3. The height of the step bearing between the base 3 and a line tangent to the dome and parallel to the base exceeds the radius of the sphere. This means that the dome extends below a diametral plane which extends parallel to the base. Otherwise stated, the step bearing is the larger portion of a sphere which is cut by a plane which is offset from the center of the sphere.

The step bearing is provided with a conical recess 4 having a height also greater than the radius of the sphere. A pivot 6 extends within the housing 4 and has a pointed cone end 5. The pivot 6 serves as a pivot for a wheel not shown, for which the described arrangement serves as a bearing. The conical recess 4 includes a greater angle than that of the cone end 5, i.e., the cone angle of the recess 4 is greater than that of the cone end 5. Thus, there remains from the base 3 an annular resting surface only.

The pivot 6 passes through a central aperture 7 of the bottom of a sleeve 8, this aperture leaving an inner annular shoulder on which rests the bearing surface 3 of the step bearing 1, pressed therein elastically by a spring 9.

The inner diameter of the sleeve 8 corresponds to the diameter of the sphere from which the step bearing is formed consequently, permitting the latter to turn like a ball within the sleeve, without play. The step bearing 2, in addition to rotation, can undergo an axial sliding against the action of the return spring 9.

It is evident that if the pivot 6 is stressed by an axial shock, the apex of cone 5 in contact with the apex of the recess 4 will raise the step bearing 1 against the action of the spring 9. This absorption by the spring 9 dampens an axial shock.

Figure 2:
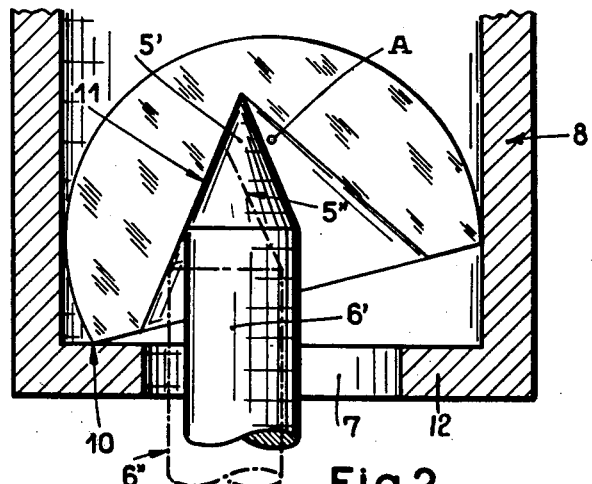
FIG. 2 is a similar view of the bearing at the time it absorbs the impact of a shock transmitted to the pivot of the wheel, the conical end of which wheel is illustrated.

FIG. 2 shows the effect of a radial shock on a pivot 6 as well as a simultaneous axial shock.

To begin with, we will describe this case corresponding to the position 5'—6' of the point 5 and the pivot 6. Due to the axial stress, the pivot will have raised the step bearing but, since there is at the same time tendency to a radial displacement toward the left in relation to the drawing, the step bearing will have moreover oscillated around a point 10 of the outer periphery of its base, by turning without play in the sleeve 8.

At a given moment of this motion, and if its amplitude is sufficient, there will be contact along to a common generatrix 11 between the recess 4 and the cone 5.

This peculiarity assumes great significance, for if the end of the point alone were to transmit and permit the absorption of all the lateral stress, it would likely be damaged. Now, as soon as the transmitted stress reaches a given value, it appears that the contact between pivot and socket passes from a point to a line, thus avoiding any deterioration of the point end.

At A in FIG. 2, is represented the initial position of the extremity of cone 5, as well as of the corresponding apex of the recess 4 as shown in FIG. 1. It appears that by passing from that position to the position 5'—6', the extremity of the cone 5 has been simultaneously raised and shifted laterally.

The position 5"—6" in dashed and dotted line of the pivot and of its point corresponds to the dampening of a purely radial stress. A consideration of FIG. 2 reveals that the apex of cone 5 displaces step bearing 1 laterally causing it to rotate such that a generatrix of cone 5 comes into contact with a generatrix of recess 4. In such a position the base 3 will be raised to a position of rest against the interior of sleeve 8.

It is evident that further radial motion could make the step bearing rock beyond the position where its spherical part remains in contact with the inside of the sleeve 8. This can be avoided by reducing or adjusting accordingly the diameter of the aperture 7 in sleeve 8, so as to limit radial displacement of pivot 6. It is understood that contact of pivot 6 with sleeve 8 takes place after absorption of a great part of the shock energy.

Worthy of notice is that in FIG. 2, the spring 9 has not been represented and that in FIG. 1, its representation is very schematic. The spring may rest against the upper portion of the step bearing, for instance as shown schematically in FIG. 1, or the spring may act on the socket through an interposed ring, or a piston guided in the sleeve 8, and in contact with the step bearing 1.

There is illustrated a plane annular base 3 of the step bearing against a corresponding flat annular shoulder or end wall 12 of the sleeve 8, but it is evident that these elements could have a suitable profile and counter-profile, such that in particular the annular bearing surface of the base 3 could be slightly conical and rest on a corresponding conical surface of the end wall of the sleeve 8.

The already described shock-absorber allows a relatively long path in the case of axial shock, so that the apex of the cone will be subjected to a relatively small force. The path in the radial direction being more limited, the forces to control displacement in this direction will be greater but, as already stated, this shock-absorber presents at a given moment a very large bearing surface (line) in relation to the support afforded by the pointed end of a cone.

Thus the best possible conditions are realized by extremely simple means, for the execution of a perfect sphere sets no more problems, let alone its accurate adjustment in a tubular body or the obtaining of a flat base and the drilling of a conical hole with an axis perpendicular to the base.

The drawing shows such a step bearing made of a jewel, which is an advantageous solution, but the use of such material is not by way of limitation.

The use of the shock absorbing bearing according to the present invention is not limited to time-piece wheels only.

What I claim is:

1. A shock absorber comprising a step bearing having a smoothly curved outer surface, a sleeve, said sleeve including a base on which said step bearing rests, said step bearing having a maximum width at a location spaced from said base whereat said bearing is in tangential contact with said sleeve, said step bearing being provided with a conical recess which narrows in a direction away from said base, and a movable member including a conical end portion, said sleeve being provided with an opening through which said movable member projects, the conical end portion thereof extending within said recess such that the apex of the conical end portion is initially in contact with the apex of the conical recess, said conical recess having a cone angle exceeding that of the conical end portion of the movable member, whereby upon lateral movement of the movable member and the conical end portion therewith said step bearing is caused to rock whereupon said conical end portion comes into contact with the recess along a line of contact.

2. A shock absorbing bearing for a movable member, said bearing comprising a step bearing provided with a conical recess adapted for accommodating therein a conical end of the movable member which has a smaller cone angle than that of said recess, a sleeve supporting said step bearing, resilient means engaging said step bearing to resist displacement thereof, said step bearing having the shape of the larger of two portions cut from a sphere by a plane offset from the center of the sphere, said sleeve including an end wall, said step bearing initially resting with the planar end thereof against said end wall, said sleeve being cylindrical and having an internal diameter equal to the diameter of the sphere, said step bearing being in tangential contact with said sleeve along a contact surface lying in a plane passing through the center of the original sphere, said recess in said step bearing tapering in narrowing manner in a direction away from said planar end.

3. A bearing as claimed in claim 2 wherein said recess has a height which is greater in extent than the radius of said sphere.

4. A shock absorber comprising a movable member having a conical end, a step bearing provided with a conical recess in which projects said conical end, said recess having a greater cone angle than said conical end, a sleeve supporting said step bearing, resilient means engaging said step bearing to resist displacement thereof, said step bearing including a dome having an outer spherical surface greater in extent than that of a hemisphere and a base portion for said dome, said step bearing resting with said base portion on said sleeve, said sleeve being cylindrical and having an internal diameter equal to the maximum width of said step bearing and contacting the latter along a surface spaced from the base, said sleeve having an opening through which projects said conical end in an initial position of the movable member to contact the apex of the recess with the apex of the conical end.

5. A shock absorber as claimed in claim 4 wherein said base portion is flat.

6. A shock absorber as claimed in claim 4 wherein said sleeve includes an end wall on which said base portion of the step bearing rests, said end wall being provided with said opening through which projects said conical end.

7. A shock absorber as claimed in claim 6 wherein said base portion and said end wall have complementary surfaces.

8. A shock absorber as claimed in claim 4 wherein said recess extends from said base portion in narrowing fashion interiorly of said step bearing.

9. A shock absorber as claimed in claim 4 wherein said recess has a height from said base portion which exceeds the radius of a sphere having an outer surface of the same curvature as said step bearing.

10. A shock absorber as claimed in claim 6 wherein said end wall of the sleeve bounding said opening therein limits the lateral movement of the movable member relative to the sleeve, said step bearing being in contact with the sleeve in at least one location on either side of the movable member with the latter in contact with the end wall bounding said opening.

References Cited in the file of this patent

UNITED STATES PATENTS

| | | |
|---|---|---|
| 1,843,868 | Copelin | Feb. 2, 1932 |
| 2,919,961 | Matthey | Jan. 5, 1960 |
| 2,970,017 | Zaslawsky | Jan. 31, 1961 |